Sept. 1, 1925.

W. MUNRO

BULL HOOK

Filed March 30, 1925

INVENTOR
Walter Munro
BY
Frank Warren
ATTORNEY

Patented Sept. 1, 1925.

1,552,338

UNITED STATES PATENT OFFICE.

WALTER MUNRO, OF BORDEAUX, WASHINGTON.

BULL HOOK.

Application filed March 30, 1925. Serial No. 19,273.

*To all whom it may concern:*

Be it known that I, WALTER MUNRO, a citizen of the United States, residing at Bordeaux, in the county of Thurston and State of Washington, have invented a certain new and useful Improvement in Bull Hooks, of which the following is a specification.

My invention relates to improvements in bull hooks and the object of my invention is to simplify the construction, reduce the weight and cost of manufacture and increase the efficiency of bull hooks of this nature by combining a bull hook and swivel into a single unitary structure thereby eliminating two or more attachments that are usually included in this type of bull hooks and swivel.

Another object is to provide a bull hook in which one end of a line is swiveled directly into the rear end of the hook and in which accidental displacement of said swiveled end is prevented by a transverse integral partition that extends crosswise of the hook and forms a stop at the front of a recess in which a cylindrical knob on the end of the line is disposed and also forms a stop for the cylindrical knob disposed upon the hauling cable.

I accomplish these objects by devices illustrated in the accompanying drawings wherein—

In bull hooks of this nature it is common practice to provide a hook and a swivel separate from each other and to connect the hook and swivel together by a link thus making three different pieces. These pieces must be comparatively large and very strong for use in logging large timber and are consequently very heavy, making them difficult and cumbersome for a man to lift and handle.

My present invention makes possible the elimination of weight in a hook and swivel construction thereby facilitating the handling and operation of the same.

Figure 3:
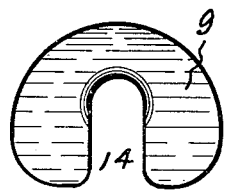
Figure 3 is a view in end elevation on broken line 3, 3 of Fig. 1.
Figure 1:
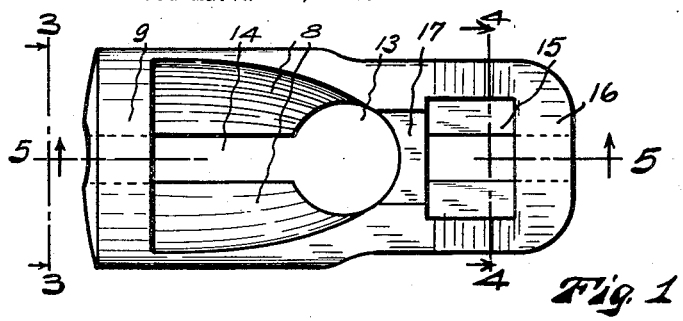
Figure 1 is a plan view of a combined bull hook and swivel constructed in accordance with my invention.
Figure 4:
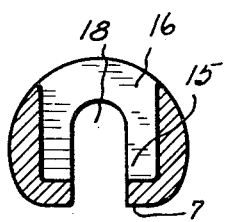
Figure 4 is a view in cross section on broken line 4, 4 of Fig. 1.
Figure 2:
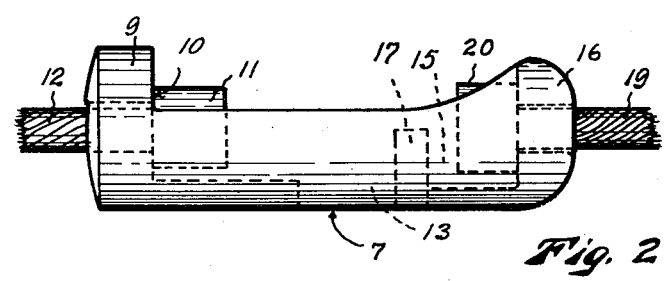
Figure 2 is a side elevation of the same, showing two lines or cables connected therewith.
Figure 5:
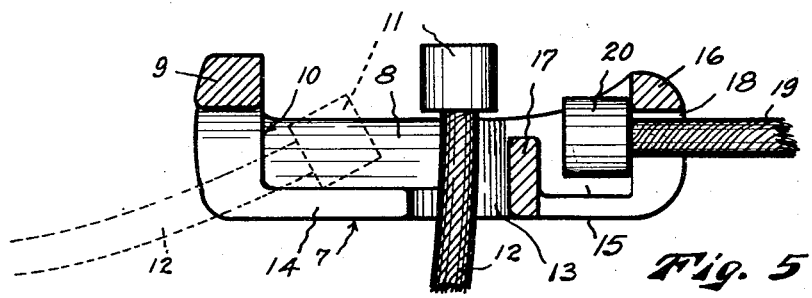
Figure 5 is a view in longitudinal midsection substantially on broken line 5, 5 of Fig. 1, the hauling cable being shown in the usual operative position and the choker cable being shown by full lines in a position it might occupy when first inserted in the hook and by broken lines in a position into which it might be turned preparatory to drawing the same taut in the hook.
Figure 6:
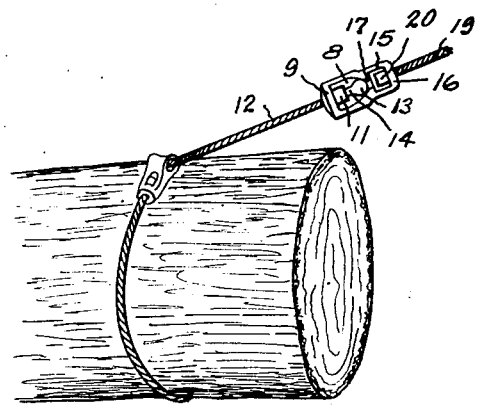
Figure 6 is a somewhat pictorial view illustrating the operation of the hook.

Referring to the accompanying drawings, throughout which like reference numerals designate like parts, I show a combined bull hook and swivel formed of a single piece of metal preferably substantially cylindrical in shape, except that it has a flattened side 7 which is hereinafter termed the back, the side opposite the back 7, hereinafter termed the front side, is recessed as at 8 except that an integral wall 9 is left at the front end, said wall 9 forming a shoulder 10 against which a cylindrical knob 11 on the end of a choker cable 12 may be drawn. The recessed portion 8 terminates at the rear end in a hole 13 of large enough diameter to permit the knob 11 on the end of a choker cable 12 to be passed through it and said hole 13 is intersected by a slot 14 that extends from the front end of the hook rearwardly. The slot 14 extends through the end wall 9, leaving an opening at the bottom or back 7 and extending to a point above the center of said end wall, as shown in Fig. 3. The slot 14 is just wide enough to permit the cable 12 to be freely passed therethrough. The choker cable 12 is inserted by first passing the knob 11 through the hole 13, as shown by full lines in Fig. 5, and then drawing the cable forwardly, as shown by dotted lines, until the knob 11 rests in the recess 8 against the shoulder 10. In a similar manner said cable is removed by pressing it downwardly and rearwardly and then drawing the knob 11 out through the hole 13.

The choker cable 12 is ordinarily of wire and does not bend easily, but it is readily seen that it will not be difficult to insert said cable in, or remove said cable from the hook and that no bending of the cable will be required either in handling or in operation.

15 is a recess near the rear end of the hook, 16 is an end wall to the rear of recess 15, and 17 is a transverse partition wall in front of recess 15 and between said recess 15 and the hole 13.

The rear end wall 16 has a perforation 18 through which extends a hauling cable 19 on the end of which is a cylindrical knob 20 that is disposed within the recess 15. The knob 20 rests against the rear wall 16 and forms a swivel connection for the hook which turns freely on the cable and is not retarded except by friction.

The transverse partition 17 serves as a stop to prevent the knob 20 from sliding through hole 18 and also serves as a stop against which the knob 11 on cable 12 may strike if cable 12 is pushed straight back in the hook, as might occur in case of slackness in the line.

The foregoing description and accompanying drawings clearly disclose a preferred embodiment of my invention, but it will be understood that this disclosure is merely illustrative and that such changes in my invention may be made as are within the scope and spirit of the following claim.

What I claim is:

A bull hook comprising a hook body having an upper and lower recessed portion with a partition wall therebetween, said lower recessed portion being provided with a key-hole slot, a shoulder disposed in said lower recessed portion, a cable having a knob on the end thereof, and arranged to be removably inserted through said key-hole slot and disposed upon said shoulder, an end wall at the end of said upper portion having an opening therein, a cable extending through said opening, and a knob on said last named cable that is adapted to be disposed in said upper recess to engage said end wall thereby forming a swivel connection.

In witness whereof, I hereunto subscribe my name this 24th day of March, A. D. 1925.

WALTER MUNRO.